Patented Feb. 19, 1924.

1,483,901

UNITED STATES PATENT OFFICE.

ALFRED R. McCANN, OF HAMILTON, OHIO, ASSIGNOR TO THE LIBERTY MACHINE TOOL CO., OF HAMILTON, OHIO, A CORPORATION OF OHIO.

VARIABLE-SPEED DRIVE.

Application filed April 20, 1921. Serial No. 462,998.

*To all whom it may concern:*

Be it known that I, ALFRED R. McCANN, a citizen of the United States, and resident of Hamilton, in the county of Butler and State of Ohio, have invented a certain new and useful Improvement in Variable-Speed Drives, of which the following is a full, clear, concise, and exact description, reference being had to the accompanying drawings, forming a part of this specification.

My invention relates to variable speed drives, and more particularly to variable speed drives wherein means are provided whereby the operator can progressively increase or decrease the speed of the driven devices without varying the speed of the initial driving element.

My invention finds great utility when used in connection with a planer. In machine tools of this class, it is desirable that the machine operations be performed in a minimum of time, and therefore a variable speed drive must be provided whereby the operator can control the cutting speeds of the various tools employed in work of this character.

The objects of my invention are—

1. To provide a variable speed drive for machine tools, the drive comprising a driving element, a driven element, intermediate means connecting the elements, and controlling means for varying the speed of the driven element, the controlling means comprising a belt, and cam actuated means for shifting the belt;

2. To provide a variable speed drive for machine tools, the drive comprising a driving element, a driven element, intermediate means connecting the elements whereby the driven element can be driven in either direction, and controlling means for increasing or decreasing the speed of the driven element in one direction;

3. To provide a variable speed drive for machine tools, the drive comprising a driving element, a driven element, intermediate means connecting the elements whereby the driven element can be driven in either direction, and controlling means for increasing or decreasing the speed of the driven element in one direction, the controlling means comprising cam actuated mechanism;

4. To provide a variable speed drive for machine tools, the drive comprising a driving step cone pulley, a driven step cone pulley, a belt disposed around the pulleys and controlling means for shifting the belt upon the pulleys, the controlling means comprising a guide for the belt and cam actuated means for displacing the guide;

5. To provide a variable speed drive for machine tools, the drive comprising a driving step cone pulley, a driven step cone pulley, a belt disposed around the pulleys, controlling means for shifting the belt upon the pulleys, the controlling means comprising a plurality of guides for the belt, and cam actuated means for successively displacing the guides.

These and other objects of my invention will be more clearly pointed out as the following description progresses, reference being had to the accompanying drawings, wherein—

Figure 1:
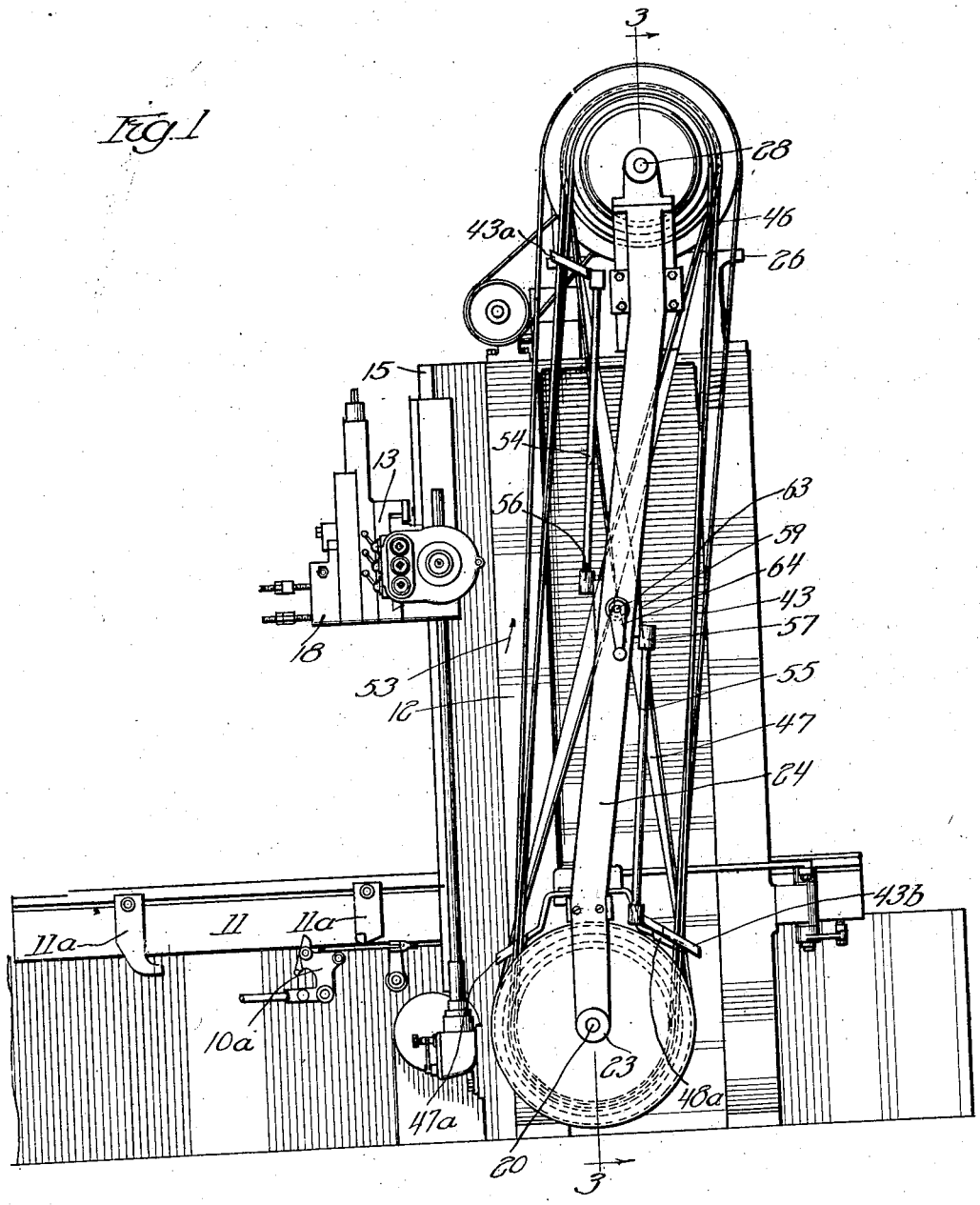
Figure 1 is a side elevation of a common type of planer, the planer being driven by means embodying the novel features of my invention.
Figure 3:
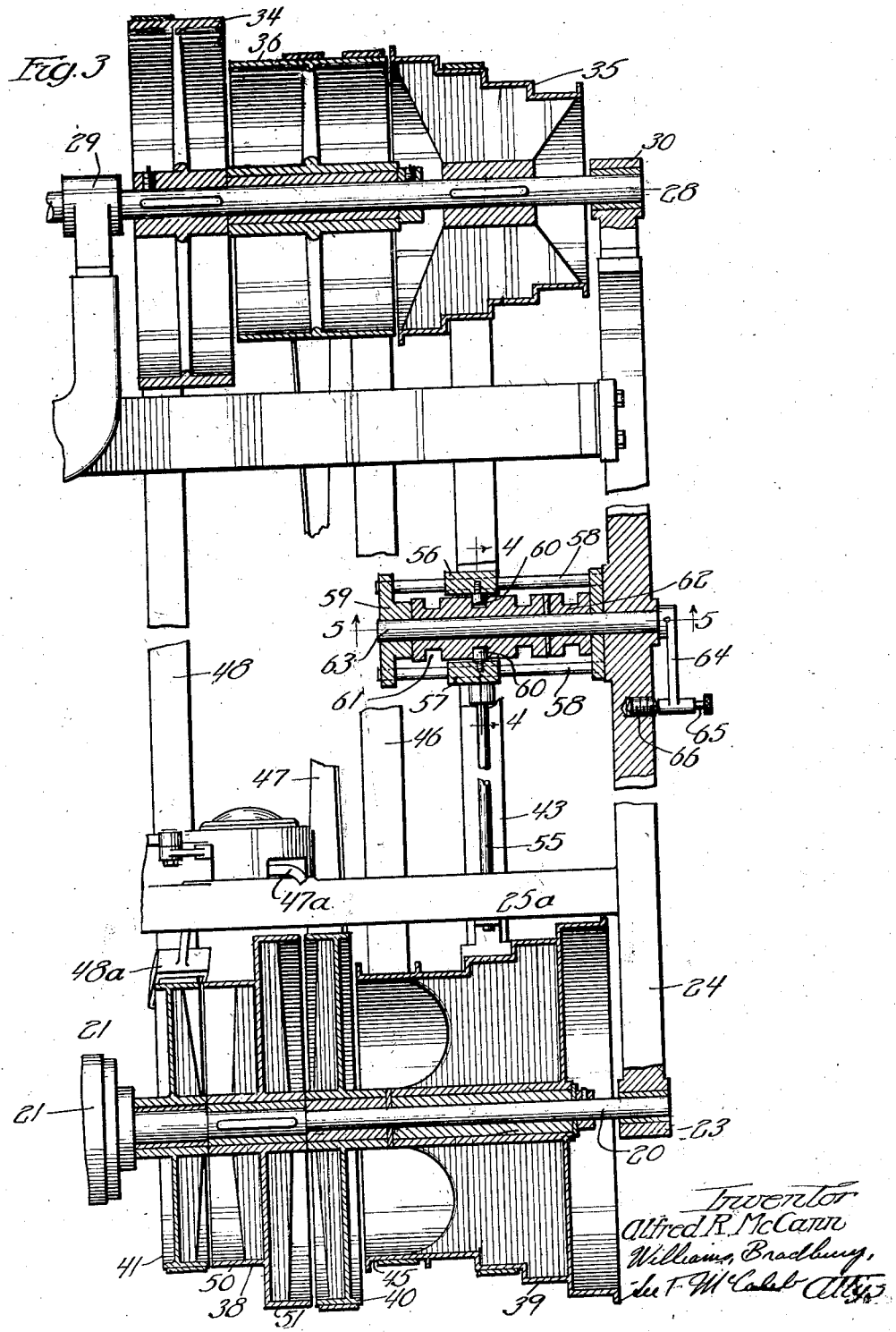
Figure 4:
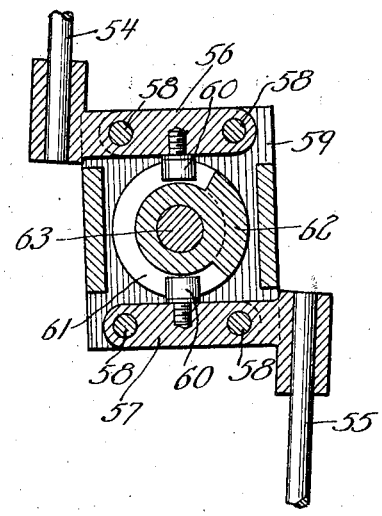
Figure 5:
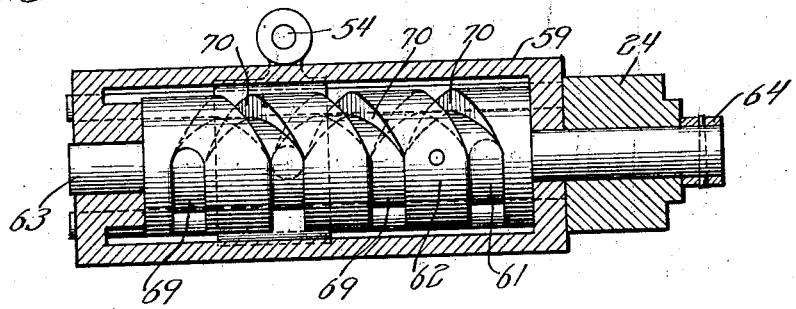

Figure 3 is a section taken on line 3—3 of Figure 1, looking in the direction of the arrows; and Figures 4 and 5 are sections taken on line 4—4 and 5—5 respectively of Figure 3, looking in the direction of the arrows.

Similar characters of reference indicate similar parts throughout the several views.

Figure 2:
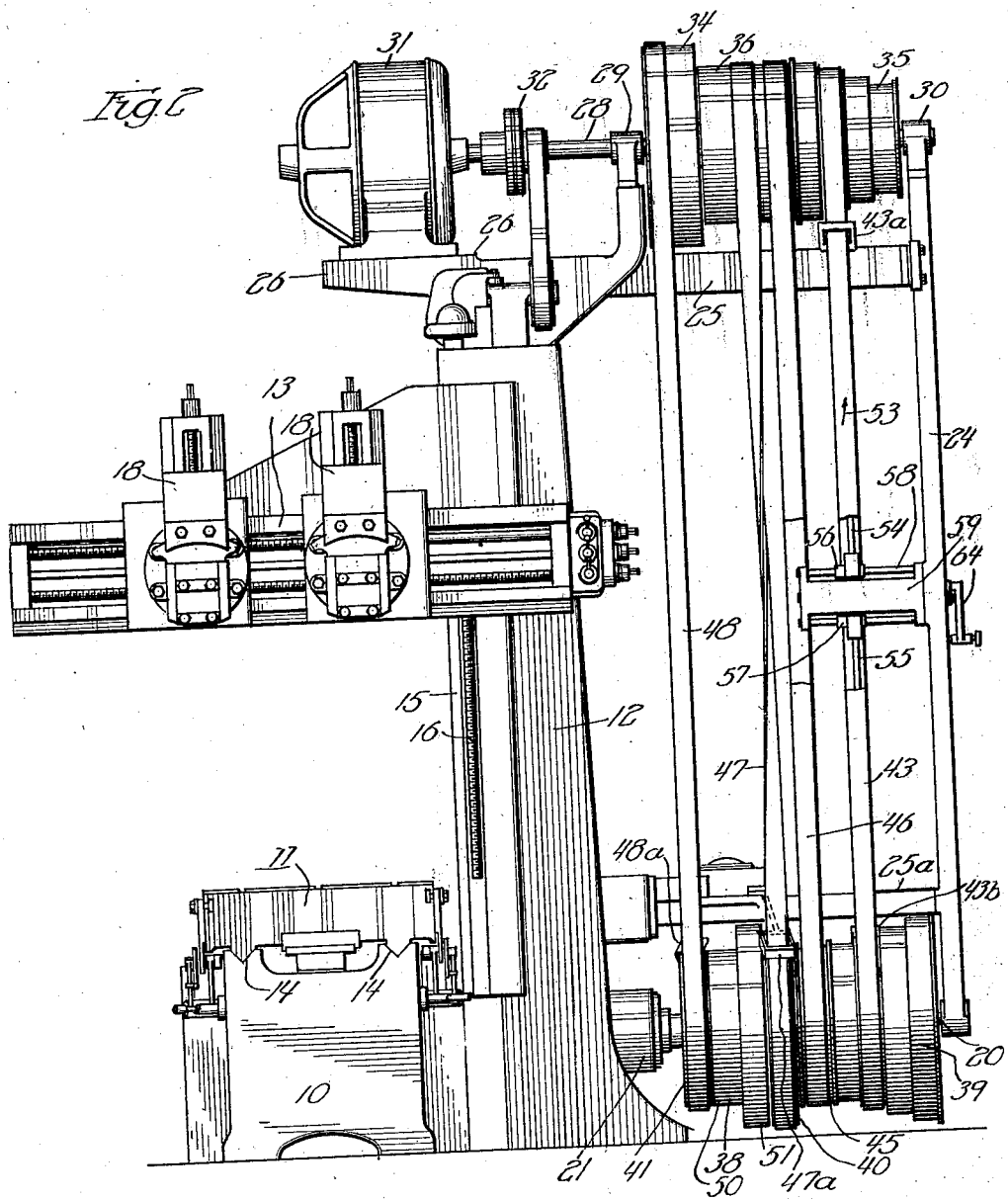
Figure 2 is an end elevation of the planer.

In Figures 1 and 2 I have illustrated a variable speed drive embodying the novel features of my invention in connection with an open side planer of a common type. The planer comprises a bed 10, a platen or table 11, a housing 12 and a cross rail 13. Articles which are to be planed may be secured upon the table 11 in the usual manner. The table is adapted to be reciprocated upon the bed 10, ways 14 being provided upon the bed for this purpose. The housing 12 is provided with the usual ways 15 whereby the cross-rail 13 is guided when it is raised or lowered by the usual elevating screw 16. The tools employed in the various operations are adjustably secured in the usual cross-rail heads 18—18 carried by the cross-rail 13. The tools may be brought into engagement with the work carried upon the table 11, and as the table is reciprocated, the tools when properly adjusted will plane the work as desired. During alternate strokes of the table 11, the work will be operatively engaged by the tools, these strokes being termed the cutting strokes, while the intervening strokes are designated as the return strokes. It is the usual practice to provide a driving means which will give the table the highest practical speed during the return strokes, the speed of the machine during the cutting strokes being varied to suit the particular conditions. The table 11 is driven by a rack and pinion (not shown). The rack is fastened to the table and the pinion is operatively connected to a driven shaft which is adapted to reverse the direction in which the pinion rotates, thereby imparting a reciprocatory motion to the table.

In the drawings, the reference character 20 designates the driven shaft. The inner end of the driven shaft 20 is journalled in a bearing 21 provided in the lower portion of the housing 12, and the outer end of the driven shaft is journalled in a bearing 23, formed on the lower end of a standard 24. An arm 25 of a bracket 26, rigidly secured to the top of the housing 12 and a bracket 25ª, fastened to the housing 12, support the standard 24.

The details of the rack and pinion drive, the manner in which the shaft 20 is operatively connected to the pinion, and the details of the mechanism for controlling the reciprocatory motion of the table 11 are not of importance so far as my present invention is concerned. Therefore the foregoing brief description of these mechanisms is sufficient for the purposes of this specification. However, some details of the mechanism for controlling the reciprocatory motion of the table will be described to facilitate this disclosure of my invention.

My improved drive comprises the driven shaft 20, a driving shaft 28, disposed above the planer proper, intermediate mechanism connecting the two shafts for driving the driven shaft 20 in either direction, and controlling mechanism for varying the speed of the driven shaft 20 in one direction.

A driving shaft 28 is rotatably journaled in bearings 29 and 30, which are secured rigidly to the bracket 26 and the standard 24 respectively. The driving shaft 28 may be connected operatively with any suitable source of power, but in the preferred form of my invention, I employ a motor, as at 31, which is connected directly to the inner end of the driving shaft 28 by the shaft coupling 32.

The intermediate mechanism connecting the driven shaft 20 and the driving shaft 28 comprises a plurality of pulleys disposed upon the two shafts, and a plurality of belts adapted to co-operate with the pulleys. Referring to Figure 3, it will be noted that a pulley 34 and a step cone pulley 35 are rigidly secured to the driving shaft 28, the cone pulley 35 being disposed towards the outer end of the shaft. Interposed between the pulleys 34 and 35, and rotatably journaled upon the shaft 28, is a pulley 36. The driven shaft 20 has a pulley 38 fixed thereon and a step cone pulley 39 and a pulley 40 rotatably journaled upon it. The pulley 40 is interposed between the pulleys 38 and 39. Another pulley 41 is interposed between the pulley 38 and the bearing 21, and is rotatably journaled upon the shaft 20.

As shown in Figures 2 and 3, the cone pulley 35 is turned to four different diameters. The cone pulley 39 has five belt engaging surfaces, four of which are aligned with the four diameters of the cone pulley 35. An endless belt 43 is disposed around the cone pulleys 35 and 39. The belt 43 is adapted to operatively engage any pair of aligned diameters of the two pulleys, and to be shifted from one pair to another. As the cone pulley 35 is rigidly secured to the driving shaft 28, the speed of the cone pulley 39 may be increased or decreased by shifting the belt 43.

The additional surface turned upon the cone pulley 39, as indicated at 45, is operatively connected by an endless belt 46 to the pulley 36, disposed upon the driving shaft 28. The pulley 36 co-operates in turn with the loose pulley 40, disposed adjacent the diameter 45 of the cone pulley 39 by means of a twisted belt 47. The twisted belt 47 will of course cause the pulley 40 to revolve in a direction opposite to that in which the pulley 36 revolves. Disposed around the pulleys 34 and 41 is an endless belt 48.

The tight pulley 38 is turned to two diameters as indicated at 50 and 51. The diameter 50 is equal to the diameter of the loose pulley 41, and the diameter 51 is equal to the diameter of the loose pulley 40. It is apparent that the belt 47 may be shifted to operatively engage diameter 51, and that the belt 48 may be shifted to operatively engage the diameter 50, the pulleys 34 and 36 being provided with faces of sufficient width to permit such displacements of the belts.

When the belt 48 is shifted to the diameter 50 of the pulley 38, the driving shaft 28 may rotate the driven shaft 20, which actuates the aforementioned rack and pinion whereby the table 11 is driven. The direction in which the table is driven by the belt 48 is termed the "return stroke", the "cutting stroke" being made by means of the belt 47 when it is shifted to the diameter 51 of the pulley 38. The belts 47 and 48 are automatically and alternately shifted to engage the pulley 38 by means comprising a plurality of shifting levers 47ª and 48ª adapted to guide the belts 47 and 48 respectively. The shifting levers are operatively connected to the usual mechanism carried upon the bed 10 and housing 12 of the planer is indicated at 10ª. The mechanism 10ª is controlled in the usual manner by the usual trips and resetting devices 11ª—11ª carried by the table 11. During the operation of the planer, the trips and resetting devices 11ª—11ª will cause the mechanism 10ª to alternately shift the belts 47 and 48 into engagement with the tight pulley 38, thereby giving the table 11 its reciprocatory motion. In the usual construction of planers of this type, provision is made whereby the operator may disengage the levers 47ª and 48ª from the actuating mechanism 10ª when the levers are in the neutral position as shown. Thus the table 11 may be brought to rest without first disconnecting the driving shaft 28 from its source of power, or in this instance, without stopping the motor 31.

I will now describe the manner in which the speed of the belt 47 is varied.

As hereinbefore described, the cone pulley 35, rigidly secured to the driving shaft 28, will rotate the cone pulley 39 by means of the belt 43, the speed at which the pulley 39 is rotated depending upon what pair of aligned diameters of the two pulleys the belt is contacting. The pulley 39 will drive the loose pulley 36 by the belt 46, and the pulley 36 will drive the pulley 38 when the belt 47 is shifted to engage that pulley. As the belt 47 is twisted in a well known manner, the pulley 38 is driven in a direction opposite to that in which it is driven by the belt 48.

The controlling means for varying the speed of the driven shaft 20 during the cutting strokes comprises cam actuated means for shifting the belt 43 upon the cone pulleys 35 and 39. The belt is guided by a pair of belt loops 43ª and 43ᵇ. The loop 43ª is disposed around the belt 43 adjacent the point where it runs onto the pulley 35, the loop 43ᵇ being similarly disposed near the pulley 39. The belt 43 travels in the direction indicated by the arrows 53—53 (Figures 1 and 2).

To shift a belt disposed around a pair of cone pulleys, that portion of the belt which is to be shifted to a smaller diameter of one of the pulleys must be displaced before that portion to be shifted to a larger diameter of the other pulley can be made to slip onto the larger diameter. The reason for this is apparent.

The belt loops 43ª and 43ᵇ are adapted to so shift the belt 43. Each of the loops 43ª and 43ᵇ is secured upon the free end of one of a pair of rods 54 and 55, the loop 43ª being secured to the rod 54, and the loop 43ᵇ to the rod 55. The rods 54 and 55 are carried by slides 56 and 57 respectively, the slides being slidably journalled upon a plurality of rods 58, disposed in a bracket 59 which is secured to the standard 24. As shown in Figures 4 and 5, each of the slides 56 and 57 has an anti-friction roller 60 adapted to ride in the cam track 61 of a cam 62. The cam 62 is rigidly secured to a shaft 63 rotatably journalled in the bracket 59, the shaft 63 projecting through the standard 24 to receive a handle 64. The handle 64 is provided with a spring actuated latch 65, which is yieldingly urged towards the standard 24 and adapted to enter a depression in the outer end of a set screw 66, threaded into the standard 24. The latch 65 is provided with a head portion 67 whereby it may be withdrawn from the depression in the set screw 66. The handle 64 and latch 65 are of well known construction, and it is readily understood that the cam 62 may be rotated in either direction by means of the handle, and locked against rotation by means of the latch, after it completes each 360° of angular displacement.

Referring to Figure 5, it will be noted that the cam track 61 consists of a slot in the cylindrical surface of the cam. The cam track comprises a plurality of dwells 69 and leads 70, each dwell being adapted to hold one of the anti-friction rollers 60 substantially stationary while the cam is rotated through 180°. The dwells 69 are equally spaced apart distances equal to the widths of the faces of the four aligned diameters of the cone pulleys 35 and 39. The leads 70 connect adjacent dwells so that by continuously rotating the cam in one direction, an anti-friction roller 60 could be made to traverse the track from one end of the cam to the other. However, as the anti-friction rollers 60—60 are diametrically positioned relatively to the cam, it is apparent that when the cam is being rotated, the rollers will alternately advance and rest. This structure permits the belt to be displaced to a smaller diameter of one of the cone pulleys before it is shifted to the larger diameter of the other cone pulley. Therefore if the belt 43 is to be shifted to occupy the largest diameter of the cone pulley 35, the handle 64 is rotated in a counter-clockwise direction (Figure 1), thus displacing the belt loop 43ᵇ so that the belt 43 will shift to the next smaller diameter of the cone pulley 39. The belt loop 43ª will then shift the belt 43 to the largest diameter of the cone pulley 35, the cam having been rotated through 360°.

In the operation of the planer, the belts 47 and 48 are automatically and alternately shifted as hereinbefore described, to operatively engage the pulley 38. This results in reciprocatory motion of the table 11. To vary the speed at which the belt 47 drives the pulleys 38 during the cutting strokes, the operator need only rotate the cam 62 in a proper direction until the belt 43 is disposed around two aligned diameters of the cone pulleys 35 and 39, which are proportioned to impart the desired speed to the pulley 36, which in turn drives the belt 47.

While I have thus described the details of one form of my invention, it is to be understood that I am not limited to these details except by the scope of the appended claims.

What I claim is:

1. In mechanism of the class described, the combination of a driving shaft, a driven shaft, two driving pulleys respectively fixed and loose on the driving shaft, two driven pulleys of different diameters fixed on the driven shaft, a belt engaging the fixed driving pulley and adapted to be shifted onto the driven pulley of smaller diameter, a belt engaging the loose driving pulley and adapted to be shifted onto the driven pulley of larger diameter, one of the belts being open and the other belt crossed, reversely stepped pulleys respectively fixed on the driving shaft and loose on the driven shaft, a belt engaging the stepped pulley on the driven shaft and the loose driving pulley, a belt engaging the two stepped pulleys, and means for shifting the last-named belt.

2. In mechanism of the class described, the combination of a driving shaft, a driven shaft, two driving pulleys respectively fixed and loose on the driving shaft, two driven pulleys of different diameters fixed on the driven shaft, a belt engaging the fixed driving pulley and adapted to be shifted onto the driven pulley of smaller diameter, a belt engaging the loose driving pulley and adapted to be shifted onto the driven pulley of larger diameter, one of the belts being open and the other belt crossed, reversely stepped pulleys respectively fixed on the driving shaft and loose on the driven shaft, a belt engaging the stepped pulley on the driven shaft and the loose driving pulley, a belt engaging the two stepped pulleys, belt-shifters respectively engaging the last-named belt adjacent the stepped pulleys, and manually operable means to move the belt-shifters successively.

3. In mechanism of the class described, the combination of a driving shaft, a driven shaft, two driving pulleys respectively fixed and loose on the driving shaft, two driven pulleys of different diameters fixed on the driven shaft, a belt engaging the fixed driving pulley and adapted to be shifted onto the driven pulley of smaller diameter, a belt engaging the loose driving pulley and adapted to be shifted onto the driven pulley of larger diameter, one of the belts being open and the other belt crossed, reversely stepped pulleys respectively fixed on the driving shaft and loose on the driven shaft, a belt engaging the stepped pulley on the driven shaft and the loose driving pulley, a belt engaging the two stepped pulleys, belt-shifters respectively engaging the last-named belt adjacent the stepped pulleys, a manually rotatable cam having a groove alternately circumferential and helical, and members secured to the belt-shifters and engaging in the groove, one of the members engaging a circumferential portion of the groove while the other member is engaging a helical portion thereof.

In witness whereof, I hereunto subscribe my name this first day of April, 1921.

ALFRED R. McCANN.

Witnesses:
ALBERT CLUTZWIG,
HARRY H. SCHUSTER.